Nov. 22, 1938.    M. ROMAINE    2,137,462
INDEX HEAD
Filed Nov. 29, 1935    2 Sheets-Sheet 1

INVENTOR.
MILLARD ROMAINE
BY
A.H.K. Parsons
ATTORNEY.

Nov. 22, 1938.  M. ROMAINE  2,137,462
INDEX HEAD
Filed Nov. 29, 1935  2 Sheets-Sheet 2

INVENTOR.
MILLARD ROMAINE
BY
H. K. Parsons
ATTORNEY.

Patented Nov. 22, 1938

2,137,462

UNITED STATES PATENT OFFICE 2,137,462

INDEX HEAD

Millard Romaine, Cincinnati, Ohio, assignor to The Cincinnati Milling Machine Co., Cincinnati, Ohio, a corporation of Ohio Application November 29, 1935, Serial No. 52,045

13 Claims. (Cl. 90—56)

This invention relates to indexing mechanisms and more particularly to an improved form of index head.

One of the objects of this invention is to provide an improved form of index head whereby large, heavy work pieces may be quickly and accurately indexed.

Another object of this invention is to provide an improved servo-motor operated index head.

A further object of this invention is to provide a means for indexing heavy work pieces without placing any strain on the index measuring means whereby more accurate results may be obtained.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
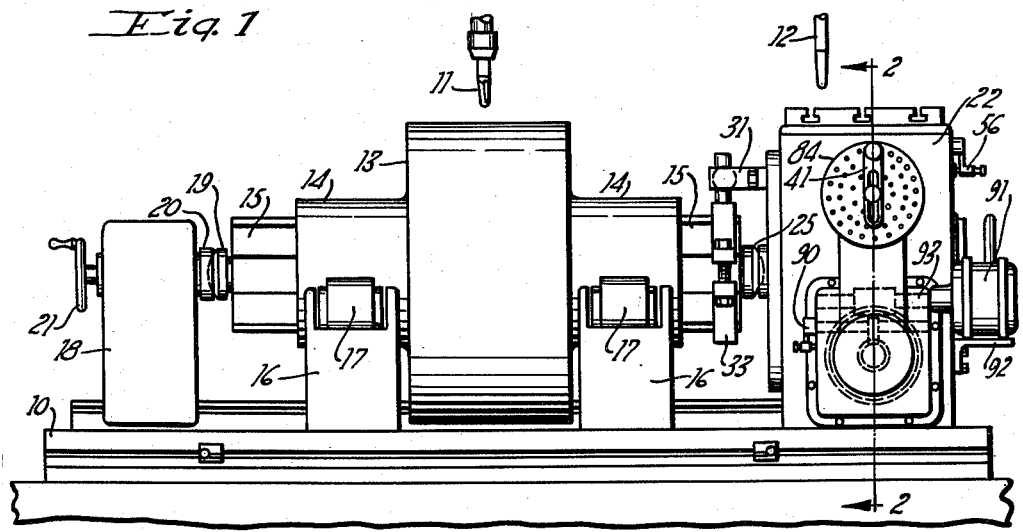
Figure 1 is a view in elevation showing an index head forming the subject matter of this invention applied to a machine tool table for indexing heavy work pieces.

In the drawings the index head forming the subject matter of this invention is illustrated as applied to a table 10 of a machine tool, which machine may be an automatic milling or engraving machine. Such machines have a milling cutter, as illustrated at 11, and a tracer, as illustrated at 12, together with mechanism not shown, whereby the tracer while in contact with a pattern automatically controls the relationship of the tool with respect to a work piece. The work piece 13 is illustrated as a large roll upon the periphery of which may be engraved a suitable design for die rolling purposes. Such rolls have large journals 14 by which they are supported in a mill and beyond the journals are wobbler necks 15 to which driving means may be connected.

For purposes of accuracy, the roll is preferably supported in the engraving machine by the same journals that it is supported upon in the mill and therefore cradles 16 are mounted on the table and these cradles have anti-friction rollers 17 upon which the journals rotate.

Since the roll is fully supported by the cradles it is only necessary to prevent end motion to maintain the roll in predetermined relation to a pattern. Therefore, the tailstock 18 is only provided with a plate 19 which is adapted to abut the end of the wobbler neck, the plate being supported for universal movement relative to the supporting shaft 20 which is adjustable by a hand wheel 21.

The index head 22 also has a plate 23 which is adapted to engage the other end of the roll, the plate being supported by a thrust bearing 24 in a universal adjustable portion 25 carried at the end of an axially adjustable shaft 26. This shaft has a threaded connection with a screw 27 which has a hand wheel 28 secured to the end thereof.

The index head 22 has a tubular shaft 29 journaled therein in which is longitudinally movable the shaft 26 and to the end of which is attached a face plate 30. This face plate may be provided with suitable means, such as the arm 31, for engaging the tail 32 of a dog 33 which may be secured to the wobbler neck 15.

The shaft 29 has a worm wheel 34 keyed thereto and intermeshing with a worm wheel 35 which is secured to a driving shaft 36.

The shaft 36 is supported in the housing 22 against longitudinal movement by thrust bearings 37 and 38. It will be noted from Figure 2 that the thrust bearing 37 is in engagement with a fixed part of the housing 22 while the thrust bearing 38 engages an adjustable plug 39 threaded in the housing, whereby proper adjustment may be made to hold the shaft 36 against axial movement.

The shaft 36 is rotated or driven at all times by a power operable motor 40 which may be of the fluid type, and this motor is coupled through a servo-control mechanism with the manually operable index lever 41 whereby the lever may be angularly positioned with ease and no apparent load thereon, while the actual work of rotating the work piece is performed by the power operable motor 40.

Figure 2:
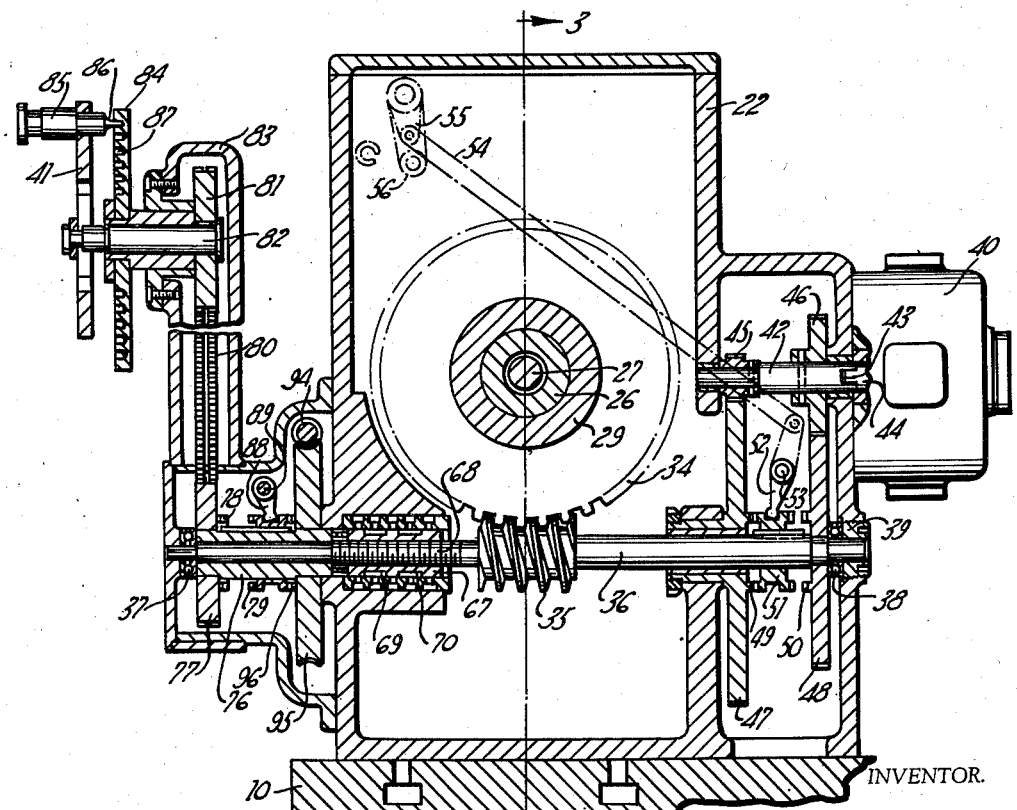
Figure 2 is an enlarged section taken on the line 2—2 of Figure 1.
Figure 3:
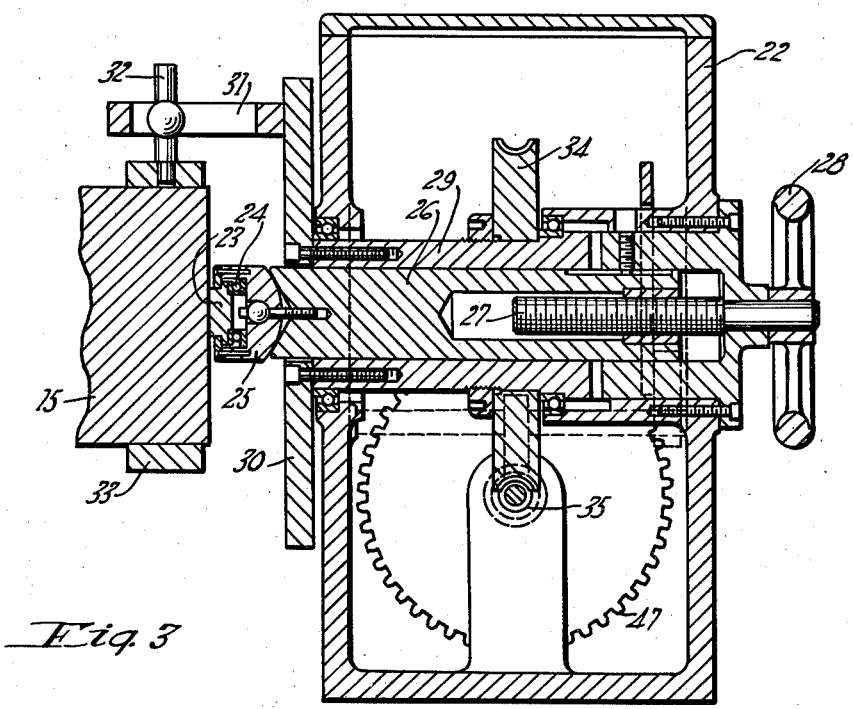
Figure 3 is a section on the line 3—3 of Figure 2.

For convenience the motor 40 may be connectible in two different ratios with the shaft 36 and to this end the housing 22 has a shaft 42 journaled therein, as shown in Figure 2, and this shaft has one end slotted at 43 for automatic connection with the shaft 44 of the motor when the same is assembled with the housing. The shaft 42 has a small gear 45 and a large gear 46 fixed thereto which intermesh respectively with gears 47 and 48, which are supported for free rotation on the shaft 36. The gears 47 and 48 have clutch faces 49 and 50 respectively formed on the opposing sides thereof for selective engagement with the shiftable clutch member 51 splined on the shaft 36.

The clutch 51 has a shifter fork 52 which is pivotally mounted at 53 and connected by a link 54 to an operating lever 55 which has an integrally connected manually operable lever 56. As shown in Figure 1, the lever 56 is mounted on the exterior of the housing 22 and within easy reach of the operator.

Figure 4:
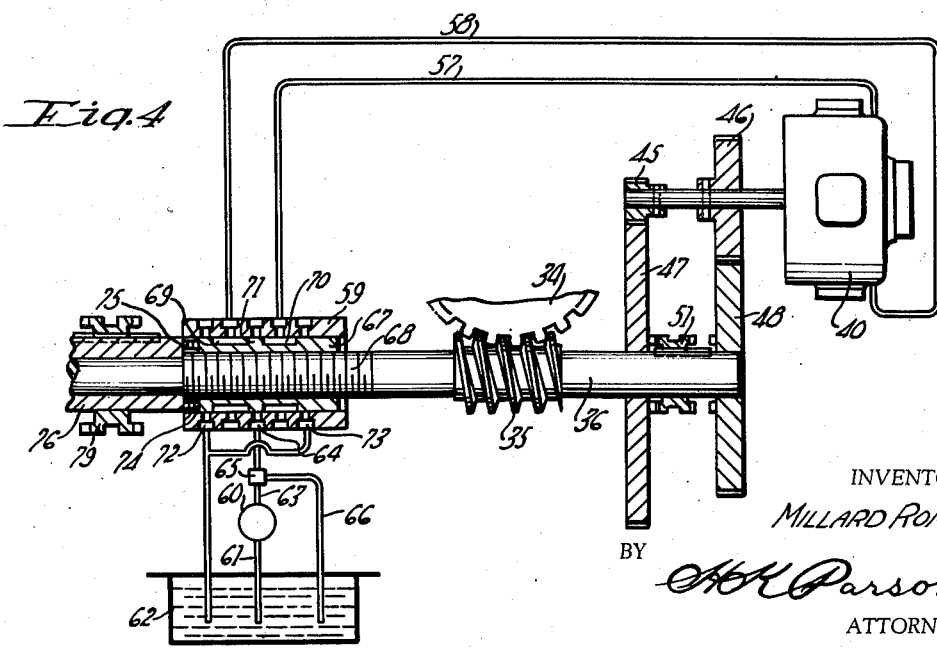
Figure 4 is a diagrammatic view of the hydraulic control circuit.

Referring to Figure 4, the fluid operable motor 40 is connected by channels 57 and 58 to a servo-valve 59 which controls the flow in these channels. Any suitable form of means may be utilized for supplying fluid pressure to the valve which may consist, as diagrammatically illustrated in Figure 4, of a pump 60 having an intake 61 for withdrawing fluid from a suitably located reservoir 62 and a delivery pipe 63 which is connected to the pressure port 64 of the servo-valve. For safety reasons, the channel 63 may have a relief valve 65 located therein, to which is connected a return channel 66 whereby part of the pump delivery may be by-passed to reservoir to prevent excessive pressures in the channel 63.

The servo-valve has a reciprocable plunger 67 which is threaded on the screw portion 68 of the shaft 36. This plunger has a pair of annular grooves 69 and 70 formed in the periphery thereof and in spaced relation so as to form an intermediate spool 71. The spool 71 is slightly narrower in width than the pressure port 64, whereby when the spool is located centrally with respect to this port there will be a small flow into each of channels 57 and 58 to maintain equal pressures therein and prevent any inadvertent movement of the parts, such as might occur if the pressure was entirely cut off from both of said lines when the valve is in a central or stop position.

Additionally, the annular grooves 69 and 70 are of sufficient width that when the valve plunger is in a central or stop position, each of the exhaust ports 72 and 73 are slightly uncovered so that a small flow to reservoir will occur at all times when the valve is in a central position. This flow to exhaust should be equal to the incoming flow at the pressure port whereby in effect there is an hydraulic resistance to flow into groove 70 which is equal to an hydraulic resistance to flow out of the groove, and when these two resistances are equal it is a well-known hydraulic principle that the pressure at a point intermediate said resistances is equal to one-half of the incoming pressure or the pressure at port 64. Since the same thing would be true in groove 69 it will be apparent that the pressure in channels 57 and 58 connected to these grooves will be one-half of the pressure at port 64, and therefore will be equal.

With respect to the method of operation, if the shaft 36 is held against rotation and the plunger 67 is rotated, the plunger 67 will move axially with respect to the shaft and thereby increase the flow into one of said channels and increase the flow out of the other channel. This will result in rotation of the hydraulic motor 40 and thereby through one of the gear trains 45—47 or 46—48 cause a feed-back to the valve by rotation of the shaft 36, but always in an opposite direction to the first rotation whereby the valve plunger 67 will be moved oppositely to its first axial direction of movement to recentralize the spool 71 with respect to the pressure port 67 and automatically terminate rotation of the motor 40.

The valve plunger 67 has teeth 74 formed on the end thereof which interengage with teeth 75 formed on the end of a sleeve 76 and these teeth are so constructed that they overlap a sufficient amount to form a driving connection, but still have sufficient clearance to permit axial movement of the plunger 67 toward or from the sleeve 76 whereby the sleeve never moves axially but the plunger 67 may be so moved. The sleeve 76 has a sprocket wheel 77 supported for free rotation thereon and this sprocket wheel has clutch teeth 78 formed on one face for interengagement with clutch teeth formed on a clutch member 79 splined on the sleeve 76. The sprocket wheel 77 is connected by a chain 80 to a sprocket wheel 81 keyed on a shaft 82 which is rotatably mounted in a bracket 83. The bracket 83 also has an index plate 84 integrally secured thereto and the shaft 82 has the index lever 41 keyed to the end thereof, whereby movement of the lever over the index plate will, through the connections described, cause movement of the servo-valve and thus, through the mechanism operated by the member 40, cause indexing of the work through angles proportionate to the angle of movement of the index lever 41.

A conventional spring pressed plunger 85 is mounted in the end of the index lever 41 and this plunger has a reduced end 86 for engagement with suitably formed holes 87 formed in the plate 84 for locking the parts in position.

The clutch 79 is operated by a shifter fork 88 fixed with shaft 89 which extends through the side of the housing and is provided with a manually operable lever 90, as more particularly shown in Figure 1.

By means of the mechanism described so far, the table 10 may be reciprocated to establish a cutting path parallel to the direction of movement of the table and at the end of each stroke of the table the indexing mechanism may be operated by manual control to present a new portion of the surface of the roll to the cutter. In other words, the surface of the roll is machined by reciprocating the table back and forth. The configuration to be produced on a roll surface may be such, however, that it would be more convenient to form part or all of it by continuously rotating the roll while the table is held stationary. In order that a substantial constant rate of rotation may be imparted to the work, and to relieve the burden from the operator, power operable means have been provided for imparting a constant rate of rotation to the servo-valve plunger. This means may comprise a fractional horse power electric motor 91 which may be supported on a bracket 92 attached to the housing 22 and operatively connected to a shaft 93 journaled in the housing 22.

As shown in Figure 2, this shaft may include a worm 94 interengaging with a worm wheel 95 mounted for free rotation on the sleeve 76. This worm wheel may have clutch teeth 96 formed on one face for interengagement with clutch teeth formed on the shiftable clutch member 79 whereby the worm wheel may be operatively connected through the sleeve 76 for effecting axial movement of the servo-valve plunger. Thus, the servo-valve may be continuously moved by the motor 91 to cause continuous uniform rotation of the work or it may be intermittently moved by the index lever 41.

There has thus been provided an improved form of index head which may be utilized for indexing heavy work pieces, which may be easily operated by the machine attendant.

What is claimed is:

1. In an index head, the combination with a shaft for rotating a work piece, of power operable means for rotating the shaft including a manually operable control mounted on the head, and means interconnecting the control with said power operable means whereby angular movements of said control will effect through said power operable means predetermined proportionate angular movements of said shaft, and feed-back means from said shaft reacting on said interconnecting means to stop said power operable means after said proportionate movement has been effected.

2. In an indexing mechanism, the combination of a housing adapted to be detachably mounted on a machine tool table and having a work spindle journaled therein, an index plate carried by the housing, a lever movable relative to said plate, and means for operatively connecting said lever to said spindle including a power operable member operatively connected to said spindle, and means for controlling the rate of movement of said member in accordance with the rate of movement of said lever, including a feed-back connection from said spindle to said member.

3. In an index head, a housing, a work spindle journaled in the housing, fluid operable means connected for rotation of said spindle, an index plate carried by the housing, an index lever movable over said plate, and means connecting said lever for causing proportionate operation of said shaft by said fluid operable means in accordance with the movement of said lever, including a feed-back connection from said spindle to said connection means.

4. An index head having a housing, a work spindle journaled in said housing, a power operable motor carried by said housing and operatively connected for rotation of said spindle, an index plate and lever, one of which is movable with respect to the other, and means interconnecting the movable member for controlling the rate of operation of said motor in proportional relationship to the rate of movement of said member, including a servo-control valve having motion transmitting connections with said motor and said movable member.

5. An index head comprising a housing, a work spindle journaled in the housing, a fluid operable motor carried by the housing and operatively connected for rotation of said spindle, a valve for controlling operation of said motor, an index plate and lever, one movable with respect to the other, and means operatively connecting the movable part with said valve for causing movement of the work spindle by said motor and feed-back connections from said spindle to said valve to cause said movement to be in proportionate relation to the movement of said part.

6. An index head comprising a housing having a work spindle supported therein, an index mechanism including a plate, and a lever movable relative to said plate; and a servo-motor mechanism self-contained in said housing for operatively connecting said lever with said spindle whereby a predetermined movement of said lever will cause a proportionate movement of said spindle.

7. In an index head having an index plate, a lever movable with respect to said plate, and a work spindle journaled therein, of means for connecting said lever for actuation of said spindle including an hydraulic servo-motor, a servo-valve, means connecting the lever for movement of the valve in a direction to cause operation of said motor, and means responsive to movement of the motor to reposition said valve in a stop position.

8. In an index head, a housing, a work spindle journaled in the housing, a fluid operable motor carried by said housing, a drive shaft, a worm and worm gear connecting said drive shaft to the spindle, a variable speed connection between the motor and drive shaft, a manually indexible lever, a servo-valve for controlling operation of said motor and having a plunger, means operatively connecting said plunger for movement by said lever, and means responsive to movement of said drive shaft to reposition said plunger.

9. An index head having a work spindle, a fluid operable motor connected for rotation of said spindle, a servo-valve for controlling rotation of said motor, a relatively movable index plate and lever operatively connected for moving said valve, a power driven rotor including a prime mover therefor carried by the housing, and a selector clutch for connecting said lever or said rotor for actuation of said servo-valve.

10. In an index head, a housing, a tubular shaft journaled in the housing, a face plate attached to said shaft and having means for driving a work piece, a member manually adjustable within said shaft and having anti-friction means in the end thereof for engaging the end of a work piece, and means for rotating said shaft without rotating said member including a servo-motor mechanism including a servo-valve, and a manually operable index mechanism operatively connected for actuating said valve.

11. In an index head, a housing, a work spindle journaled in the housing, fluid operable means connected for rotation of said spindle, an index plate carried by the housing, an index lever movable over said plate at will in either direction, and means connecting said lever for causing proportionate movement of said shaft by said fluid operable means in accordance with the amount and direction of movement of said lever, including a feed-back connection from said shaft to said connecting means.

12. In an index head, a housing, a work spindle journaled in the housing, fluid operable means connected for rotation of said spindle, an index plate carried by the housing, an index lever movable intermittently and at will over said plate and in the same direction, and means responsive to the intermittent movement of said lever for causing intermittent operation of said shaft in proportionate amounts in accordance with the movement of said lever by said fluid operable means, including a feed-back connection from said shaft to said responsive means.

13. An index head having a work spindle, a fluid operable motor, an output shaft, means to connect said motor to said shaft in different ratios, a servo-control valve for controlling the rate of rotation of said motor, means coupling the output shaft to said spindle, a relatively movable index plate and lever, a power driven rotor, and a selector clutch for connecting said lever or said rotor for actuation of said servo-valve whereby said spindle may be manually indexed or power actuated at a continuous rate.

MILLARD ROMAINE.